United States Patent
Brink

(10) Patent No.: US 6,572,984 B2
(45) Date of Patent: Jun. 3, 2003

(54) METAL LAMINATE STRUCTURE AND METHOD FOR MAKING

(75) Inventor: Damon Brink, Goleta, CA (US)

(73) Assignee: Intriplex Technologies, Inc., Santa Barbara, CA (US)

( * ) Notice: Subject to any disclaimer, the term of this patent is extended or adjusted under 35 U.S.C. 154(b) by 0 days.

(21) Appl. No.: 09/837,354

(22) Filed: Apr. 17, 2001

(65) Prior Publication Data

US 2002/0148880 A1 Oct. 17, 2002

(51) Int. Cl.$^7$ ................................ B23B 13/06
(52) U.S. Cl. ........................................ 428/685
(58) Field of Search ................... 428/685, 684, 428/929, 931; 228/194, 193, 208, 198

(56) References Cited

U.S. PATENT DOCUMENTS 3,993,238 A * 11/1976 Brook et al.
4,818,634 A * 4/1989 Bliss
5,491,035 A * 2/1996 Carey, II et al.
6,159,618 A * 12/2000 Danroc et al.

FOREIGN PATENT DOCUMENTS

JP 57-202965 * 12/1982

* cited by examiner

Primary Examiner—Tom Dunn
Assistant Examiner—Jonathan Johnson
(74) Attorney, Agent, or Firm—Michael G. Petit

(57) ABSTRACT

Laminates consisting of a high-damping core material sandwiched between two stiff, weldable skins. The laminate structures have increased resonant freguencies, improved damping characteristics, do not outgas, and may have a decreased inertial moment. The laminates are comprised of 100% metal constituents, and do not rely on epoxy or low-melting point solders.

7 Claims, 4 Drawing Sheets

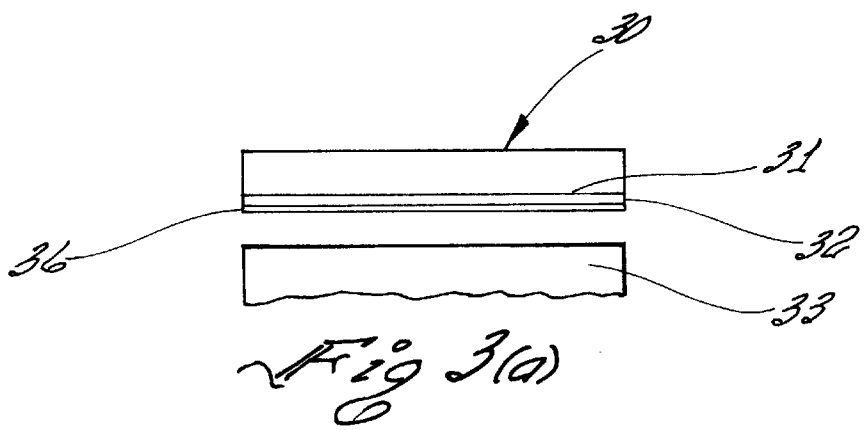
Fig 3(a)
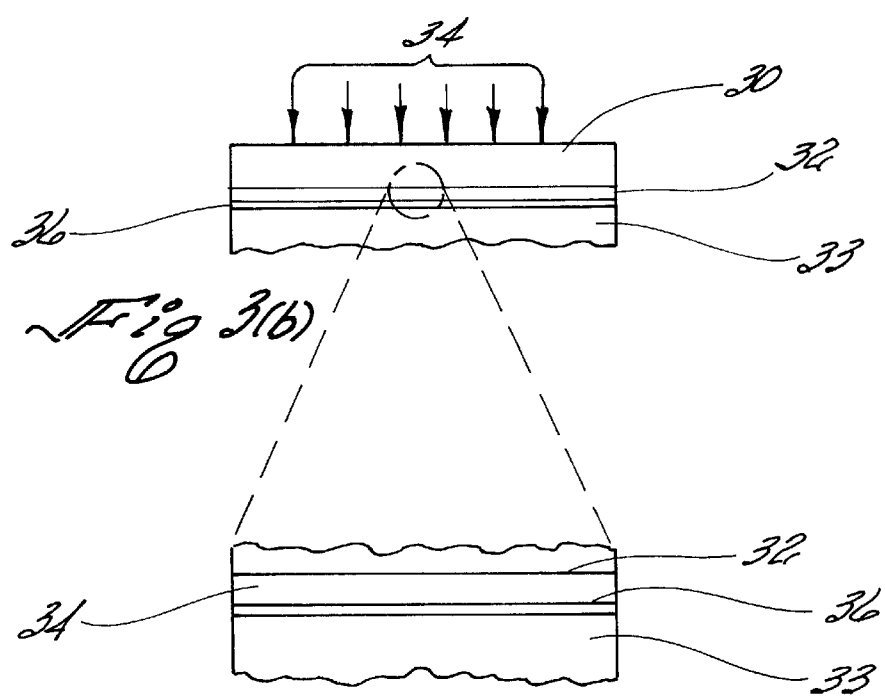
Fig 3(b)
Fig 3(c)
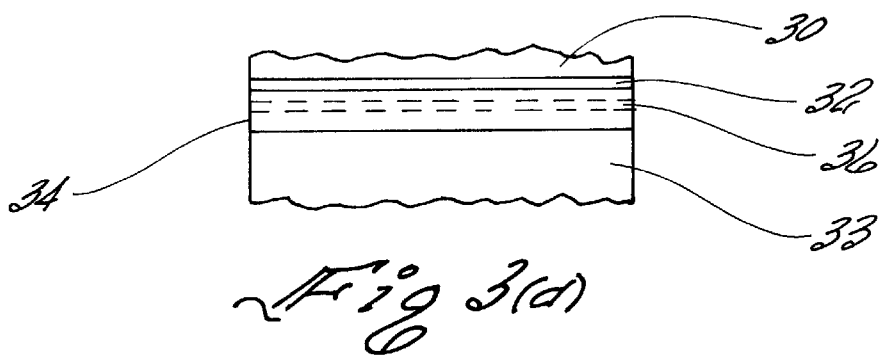
Fig 3(d)

| SAMPLE | THICKNESS | SST GAGE | WEIGHT | FREQUENCY | DAMPING |
|---|---|---|---|---|---|
| 301 SST | 0.010 | 0.010 | 0.298 gm | 1099 Hz | 1.4 E-3 |
| LAMINATE 1 | 0.015 | 0.005 | 0.333 gm | 1843 Hz | 2.5 E-3 |
| LAMINATE 2 | 0.017 | 0.005 | 0.353 gm | 2142 Hz | 2.2 E-3 |
| LAMINATE 3 | 0.012 | 0.002 | 0.165 gm | 1768 Hz | 2.3 E-3 |

METAL LAMINATE STRUCTURE AND METHOD FOR MAKING

BACKGROUND OF THE INVENTION

1. Field of the Invention

Laminate structures having improved dynamic properties, specifically increased resonant frequencies and higher damping, and more particularly laminate structures comprising weldable metals and a method for making the laminates.

2. Prior Art

The need for laminate structures made in accordance with the present invention is exemplified by discussing the performance limitations of structures made in accordance with the prior art in a representative application. Accordingly, while the limitations of prior art structures used in computer disk drives is presented as an exemplary application for the laminate structures of the present invention, the limitations inherent in prior art monolithic (i.e., non-laminate) structures, particularly in regard to their vibrational properties, similarly limits the performance of prior art structures in other applications. Although the present invention is discussed in the context of a particular application, the particular application is exemplary and should not be construed as limiting the scope of the invention.

At the present time, most computer systems store data on a disk drive. A disk drive includes inter alia a rotatable disk, and an actuator that moves a transducer over the surface of the disk. The rate at which data can be transferred to the disk drive depends, in part, on the dyanamic performance of the actuator. Stiffer actuating systems with higher resonant frequencies allow the transducer to be moved at higher speeds, facilitating higher rates of data transfer. In addition, increased damping characteristics of the actuator limit excursions of the load beam and shorten transducer settling time-both of which increase drive performance. These features will also help to accommodate the increasing demand for higher areal densities prevalent in the disk drive industry. Moverover, disk drives sometimes operate in hazardous environments that may include being dropped from several inches. Such shock loads, when experienced during disk operation, may drive a resonant response in the loadbeam. Notwithstanding these excitations, the load beam, and the transducer attached thereto, must maintain the transducing relationship between the transducer and the surface of the disk at all times. Higher stiffness suspension systems with increased damping capacity help to limit the elevational excursions of the load beam that may cause damage to the surface of the disk, the transducer and/or the load beam, or the lateral excursions of the load beam that may cause data track mis-registration and read-write errors. It is, therefore, desirable to provide a material for fabricating a load beam, mounting arm and/or flexure having a high stiffness and damping capacity.

Material damping occurs when repetitive deformation (vibration) of a material is dissipated through internal energy losses, usually in the form of heat. In general, the phenomenon of damping, also known as internal friction, can be characterized by a lag between the application of a stress and the resultant strain. The mechanisms that give rise to damping in metals include the interaction of specific point defects with other point defects or dislocations, precipitation phenomena, and ordering effects. Thus, prior art efforts to produce structures having desired damping characteristics include developing new alloy compositions and laminate structures that attempt to enhanse these mechanisms, thereby improving damping properties.

Transient liquid phase diffusion bonding has been shown to be a useful method for producing high quality diffusion bonds in high temperature metal laminate structures. Such bonding is described in detail in the U.S. Pat. No. 3,678,570 to D. F. Paulonis et al, and is incorporated herein by reference thereto. Barlow et al., in U.S. Pat. No. 4,208,222, disclose a method for carrying out transient liquid phase diffusion bonding by depositing a metallic coating on at least one of the superalloy surfaces to be bonded and boriding a portion of the metallic coating to form a working coating having an overall composition resembling that of an interlayer alloy and an overall melting temperature less than that of the superalloys. When the superalloy surfaces are placed in contact and heated to above the melting temperature, the partially borided metallic coating functions as an interlayer alloy to effect bonding.

Ryan, in U.S. Pat. No. 4,700,881, discloses an improvement of transient liquid phase bonding through the use of multiple boronized interlayer foils. By providing the interlayer in the form of multiple foils a reservoir of liquid material is formed during the bonding process which eliminates the porosity encountered with traditional transient liquid phase bonding such as described in U.S. Pat. No. 3,678,570, referenced above. The use of multiple foils is especially appropriate when bonding fine-grained materials at constant temperature. By using two foils, each of which has boronized surfaces, upon heating to elevated temperatures the assembled foils melt, both at their outer portions which are adjacent the articles being joined, and at the interface between the two foils. By providing a boron rich zone and consequently a liquid zone in the center of the foil assembly, the previously encountered tendency to form porosity is essentially eliminated. The process has particular utility in the bonding of fine-grained superalloy articles in which porosity has previously been a problem.

Gaynes et al., in U.S. Pat. Nos. 5,713,508 and 5,542,602 disclose a method for forming a metallurgical bond between two metal surfaces including the steps of placing a metal coating on at least one of the surfaces, applying a compressional force to the juxtaposed metal surfaces, and alloying the metal coating with both of the two metal surfaces at a temperature at or below 237° C. The coating materials employed include indium, tin and lead. A device is provided including a metallurgical bond between two bodies of noble metal including a region extending into the two bodies of noble metal comprising an alloy of noble metal and a metal selected from the group consisting of indium, tin and lead.

Diffusion causes a transient liquid phase to be interposed in the interface. Accordingly a flow of the transient liquid phase can correct the irregularities, asperities, or other undesired structural aspects in the abutted surfaces. Fitzgerald et al. U.S. Pat. No. 5,836,075, teach machining of the mating surfaces prior to application of the bonding material to remove oxide from the mating surfaces and ensure dimensional tolerances. Bonding material is applied to the mating surfaces by sputter deposition. A mask(s) may also be applied to the mating surfaces prior to application of the bond material so as to selectively apply bond material at only predetermined locations on the mating surface, thus eliminating excessive use of bond material for bonding the component sub-structures.

Bampton et al., in U.S. Pat. No. 5,289,967 disclose a method for fabricating metal matrix composites. Optical or reinforcing fibers, which may be in the form of monofilaments, mats, or tow, are consolidated into a metal matrix alloy. Grooves may be provided in the metal matrix material for holding and positioning the fibers. A transient liquid diffusion bonding agent in the form of a powder is blended with powdered filler material, such as powdered matrix material, to provide a vehicle for consolidating the fibers into the metal matrix. The fibers and the blended powder are placed between layers of the metal matrix material and the whole structure is heated under minimal pressure to liquefy the bonding agent. The liquid bonding agent wets each fiber and interdiffuses with the matrix material, resulting in rapid isothermal solidification of the alloy and consolidation of the fibers in the matrix.

As discussed above, for certain applications such as computer disc drive components, it is desirable to employ structural components which exhibit higher frequency fundamental vibrational modes. In addition, components comprised of a material that damps vibrational energy are preferable for fabricating disk drive suspension arms. Accordingly, there is a current demand for a laminate structure having a high damping core interposed between stiff outer layers that is suitable as a structural element in such applications.

SUMMARY

It is a primary object of the invention to provide.metal laminate structures having vibrational and damping properties suitable for use in applications where increasing the vibrational resonant frequencies of the structure is desirable.

It is another object of the invention to provide metal laminate structures that undergo minimal outgassing or degradation after the production thereof.

It is yet a further object of the invention to provide a method for making a laminate structure meeting the above objectives wherein the structure comprises a high damping core interposed between two stiff, possibly weldable sheets of metal.

It is another object of the invention to provide a laminate structure comprising a core consisting essentially of a layer of Cu—Mg alloy disposed between two layers of stainless steel and having unitary construction.

To make the laminate structures, copper plated surfaces of metals such as stainless steel are placed in contact with an interposed layer of magnesium and the Cu and Mg allowed to interdiffuse at elevated temperatures. The metals are chosen such that diffusion creates an alloy with a melting point lower than either of the constituents. The processing temperature is set so that the Cu—Mg alloy melts but leaves the base metals in solid form, causing a thin layer of liquid to form.and wet both sides of the interface. External pressure is applied to the opposing base metals and continued diffusion elevates the melting temperature of the liquid phase and causes it to solidify isothermally, creating a bond between the base metals. The pressure induces flow of the liquid phase in order to disrupt an oxide layer on the surface of the interlayer or base metals. Highly polished surfaces on the base metals comprising the laminate structure are not required because the applied pressure causes the metal (in thin sheet form) to deform and create the intimate metal-metal contact necessary for diffusion.

The features of the invention believed to be novel are set forth with particularity in the appended claims. However the invention itself, both as to organization and method of operation, together with further objects and advantages thereof may be best be understood by reference to the following description taken in conjunction with the accompanying drawings in which:

BRIEF DESCRIPTION OF THE DRAWINGS

FIG. 3(a) is a cross-sectional view of an upper layer of a laminate structure prepared for induced-flow liquid phase bonding in accordance with the present invention, illustrating the interface between an upper stainless steel sheet and an underlying layer of magnesium prior to bonding.

FIG. 3(b) is a cross-sectional view of the upper layer of a laminate structure in accordance with FIG. 3(a) wherein a layer of copper plating on a surface of the stainless steel sheet is brought into contact with the magnesium layer under elevated temperature and pressure.

FIG. 3(c) is a cross-sectional view of an upper layer of a laminate structure in accordance with FIGS. 3(a) and 3(b) showing an enlarged portion of the laminate interface as diffusion of the copper and magnesium layers proceeds under conditions of elevated temperature and pressure.

FIG. 3(d) is a cross-sectional view of the upper layer of a laminate structure in accordance with FIGS. 3(a–c) wherein pressure is increased and the laminate structure is allowed to solidify under isothermal conditions.

DESCRIPTION OF THE PREFERRED EMBODIMENTS

Figure 1:
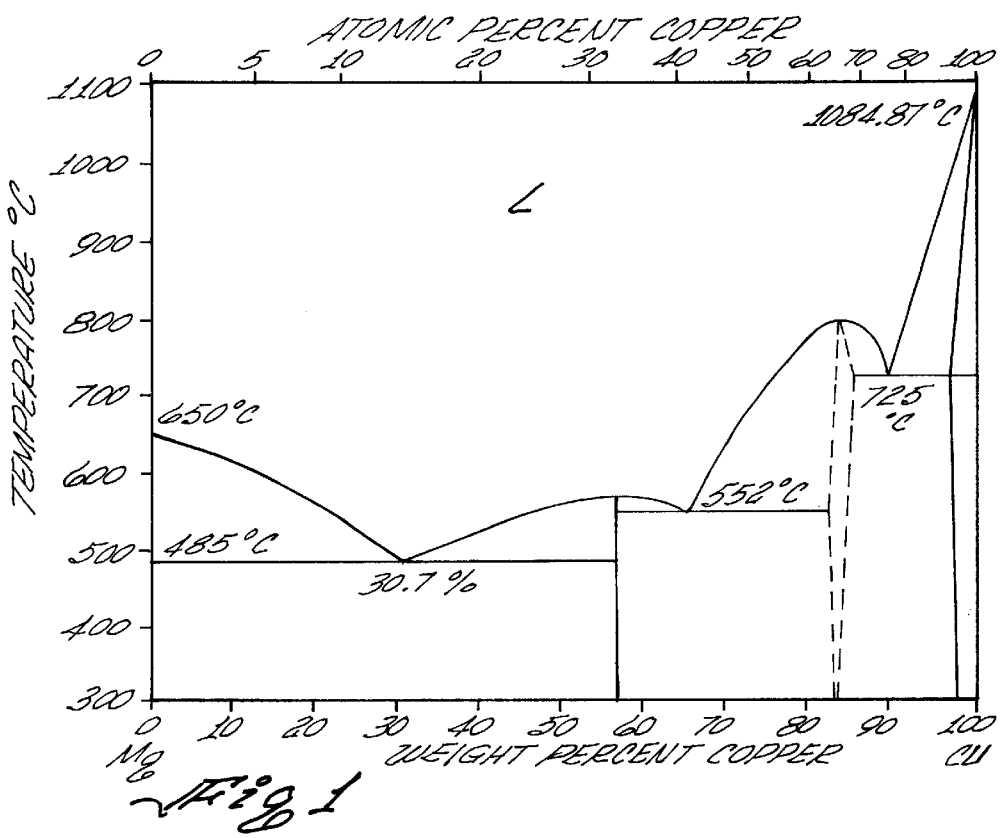
FIG. 1 is a phase diagram showing the melting point of various alloys comprised of copper and magnesium.

As previously discussed, transient liquid phase bonding (TLP) is well known in the art as a method for making laminated metal structures. In accordance with the TLP method, surfaces of dissimilar metals are placed in contact and allowed to interdiffuse at elevated temperatures. The metals are chosen such that diffusion creates an alloy with a melting point lower than either of the constituents. The processing temperature is set so that the alloy melts but leaves the base metals in solid form, causing a thin layer of liquid to form and wet both sides of the interface. Continued diffusion elevates the melting temperature of the liquid phase and causes it to solidify isothermally, creating a bond between the base metals. In general, this process requires the bonding surfaces to be highly polished and requires little or no pressure throughout the process.

In a preferred embodiment of the present method, copper plated surfaces of dissimilar metals such as, for example, stainless steel, titanium, or nickel, are placed in contact with an interposed layer of, for instance, magnesium or aluminum, and allowed to interdiffuse at elevated temperatures. The choice of metal used for plating the dissimilar metal and for the interposed layer are selected such that interlayer diffusion of the metal atoms creates an alloy with a melting point lower than either of the constituents. For example, if copper is used as the plating metal and a sheet of magnesium as the interposed layer, the processing temperature is set such that the Cu—Mg-alloy melts but leaves the base metals in solid form, causing a thin layer of liquid to form and wet both sides of the interface. The aforementioned limitation of the prior art TLP method, requiring that both metallic surfaces must be highly polished prior to plating in order to ensure intimate contact between the surfaces, is necessary in order to assure homogeneous diffusion. The step of polishing adds to the cost of structures laminated thereby.

In accordance with the present method, a layer of magnesium is interposed between the plated surfaces. External pressure is then applied to the opposing base metals comprising the outer layers or "skins" of the laminate structure, and the compressed composite heated. As diffusion of copper and magnesium atoms in and adjacent to the Cu—Mg interface progresses, the change in the relative concentration of the elements elevates the melting temperature of the liquid phase within layers of the interface and causes such layers to solidify isothermally, creating a bond between the base metals. Prior to solidification, the pressure is increased in two steps in order to induce flow of the liquid phase which penetrates and disrupts an oxide layer that is normally present on the inner surface of one or both of the base metals comprising the laminate structure. Highly polished surfaces on the base metals comprising the laminate structure are not required because the applied pressure causes the metal (in thin sheet form) to deform and create the intimate metal-metal contact necessary for homogeneous diffusion.

Turning now to FIG. 1, a phase diagram is presented illustrating the dependence of the solid-liquid phase transition temperature on the composition of the Cu—Mg alloy. While magnesium melts at 650 degrees C. and copper melts at 1084.87 degrees C., it is seen that a binary composition comprised of about 30.7 weight percent copper forms a eutectic having a melting point at 485 degrees C., well below the melting point of Cu, Mg or stainless steel. Thus, if the temperature of a laminate is increased to a temperature between 485 degrees C. and 650 degrees C., the copper covering the base metals that comprise the laminate diffuses into the constrained Mg interlayer. As diffusion proceeds, the concentration of Cu in Mg increases and the Cu—Mg alloy melts. If pressure is applied to the exterior surface of the base metals, the liquid alloy layer conforms to the surrounding surface contour.

Figure 2:
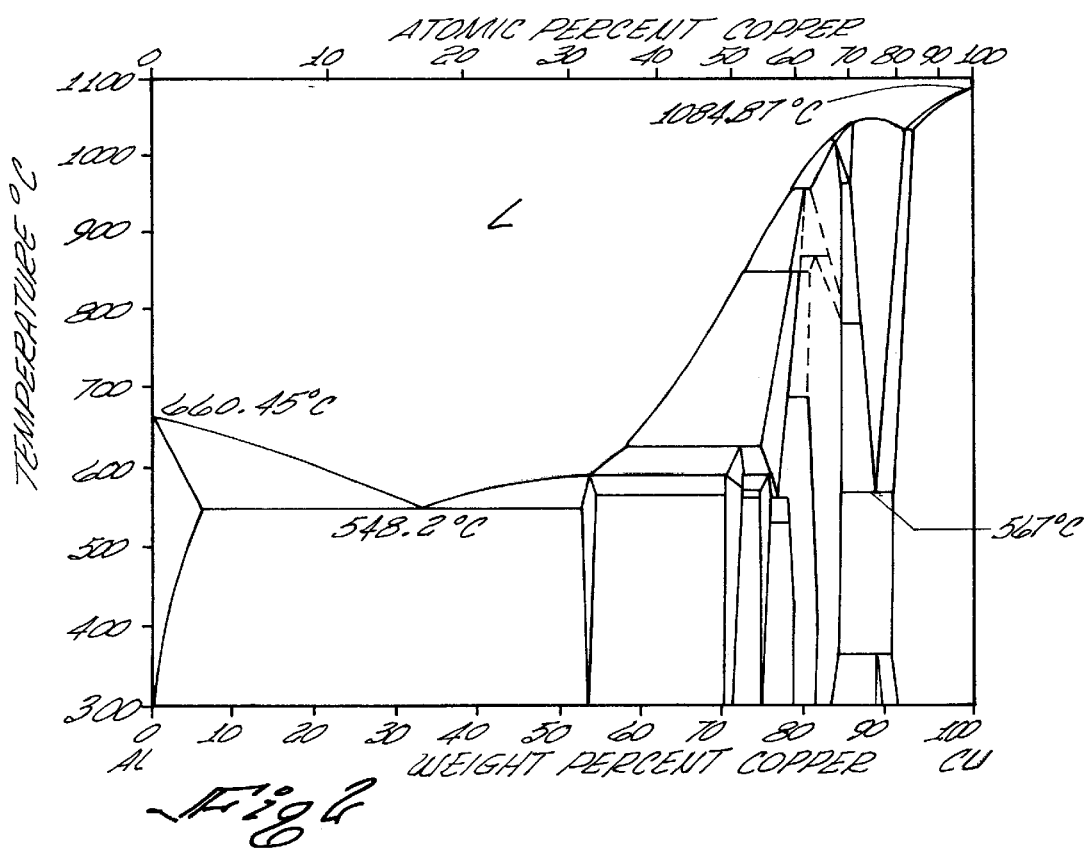
FIG. 2 is a phase diagram showing the melting point of various alloys comprised of copper and aluminum.

FIG. 2 is a phase diagram showing the melting point of various alloys comprised of copper and aluminum. The metals form a low melting eutectic at about 32 weight percent copper. The application of external pressure together with the fluid behavior of the eutectic at temperatures above 548.2 degrees C. enables the eutectic composition to fill voids between two sheets of copper plated base metal and provide a strong uniform bond between the base metals when the laminate is cooled.

The sequence of steps in a laminating process, in accordance with a preferred embodiment of the present invention, are illustrated in FIGS. 3(a–d). FIG. 3(a) shows, in side cross-sectional view, a sheet of stainless steel 30 having an inner surface 31 that is plated with a layer of copper 32. The layer of copper 32 may further include an oxide layer 36 inasmuch as the inner surface of the layer of copper plating 32 is not polished. A thin sheet of magnesium 33 is juxtaposed with the copper plated surface 32 of the stainless steel sheet 30. Pressure is applied to compress the copper plated surface 32 against the layer of magnesium 33 as shown in FIG. 3(b). As the temperature of the composite structure is increased, the copper and magnesium atoms diffuse into the respective adjacent layer of magnesium and copper. As the concentration of copper in the magnesium interlayer increases to about 26% and the temperature exceeds approximately 520° C., the alloy layer melts and begins to flow as shown in FIG. 3(c), breaking up and dispersing the oxide layer 36. As the copper concentration within the layer of Mg continues to increase, the thin layer comprising the liquid phase migrates toward the stainless steel and away from the sheet of magnesium. The process is allowed to continue isothermally until all the copper has diffused to the magnesium and the relative concentrations of Cu and Mg in the alloy layer disposed between the stainless steel skins drives the transition temperature above the processing temperature, e.g. 520° C., at which point the alloy layer is permitted to solidify isothermally. The laminate structure is then allowed to cool.

Figure 4:
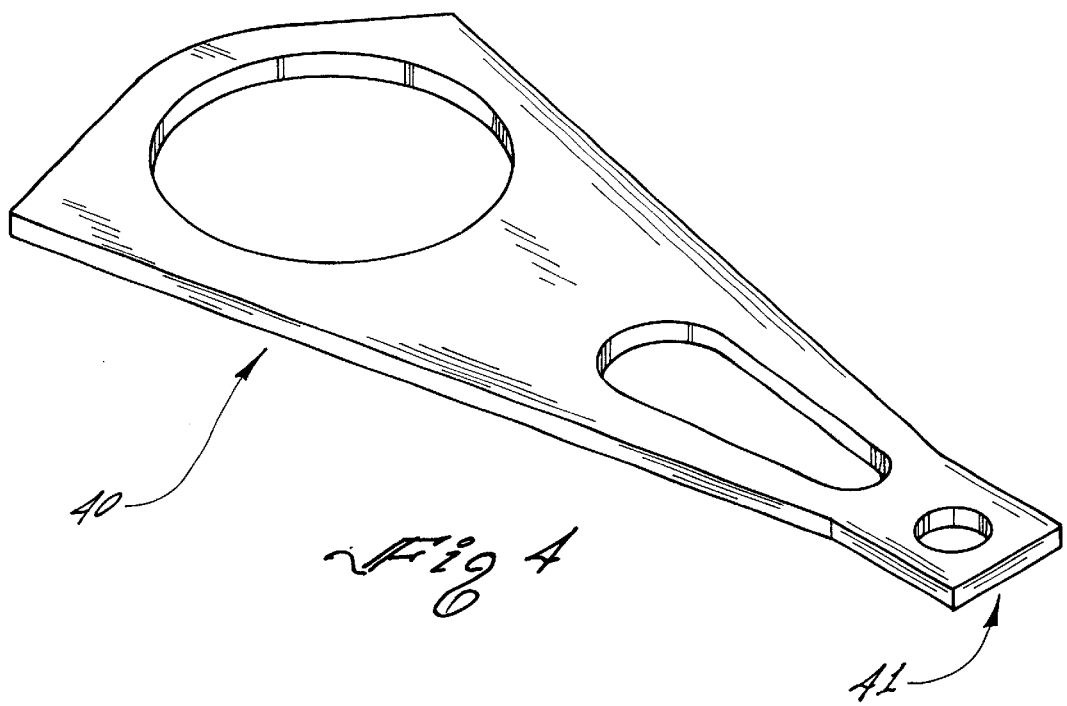
FIG. 4 is a perspective view of a discrete suspension arm of the type commonly used to support a magnetic pickup in computer disk drives.

An example of a laminate structure which exhibits enhanced performance when made in accordance with the present invention is a transducer suspension arm. FIG. 4 is a perspective view of a suspension arm 40 of the type commonly used to support a magnetic recording head in computer disk drives. Due to the stressful operating environment of such a component and the delicacy of the stability requirements, it is imperative that the motion of the suspension arm does not cause the arm 40, or a component mounted on the distal end 41 thereof, to touch the disc surface (not shown). Thus, it is desirable for the fundamental frequency of the vibrational modes to be substantially different than the frequency of the vibrational noise to which the suspension arm is subjected. In addition, the material and construction of the suspension arm should provide vibrational damping to limit the excursions of the suspension arm in response to a mechanical displacement perturbation.

Figure 5:
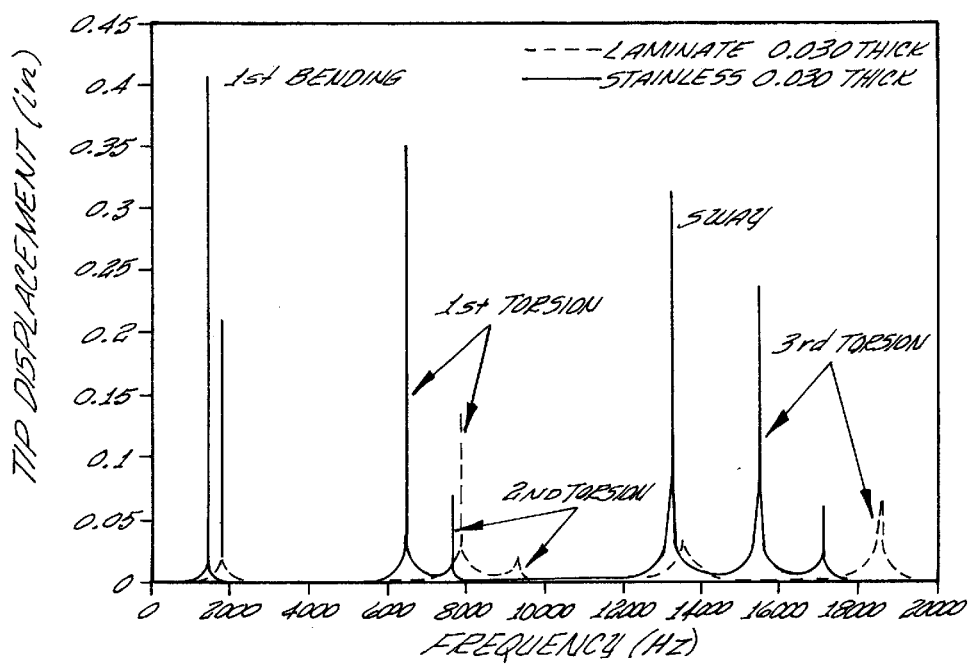
FIG. 5 is a graphical representation showing the computed vibrational frequency and amplitude of several vibrational modes for the suspension arm illustrated in FIG. 4 for a unitary stainless steel structure (solid) and a laminate stainless steel structure (dotted) of similar thickness made in accordance with the present invention in response to a prescribed vibrational input.

Turning next to FIG. 5, the computed vibrational frequency and amplitude of several vibrational modes for the suspension arm illustrated in FIG. 4 is shown. The solid lines correspond to the calculated vibrational frequency and amplitude for a unitary stainless steel suspension arm and the dotted lines correspond to a laminate stainless steel suspension arm, made in accordance with the present invention, in response to a forced vibrational excitation applied opposite of the distal end. The fundamental frequency of the first bending mode for the laminate suspension arm (dotted) is higher than the fundamental frequency of this mode in a unitary stainless steel suspension arm (solid) having the same dimensions. In addition, the amplitude of the vibration for the laminate is less than for the stainless steel suspension arm. An even greater difference in these two properties in suspension arms 40 is exhibited in FIG. 6, wherein the response of the SST suspension arm (solid line) and the laminate suspension arm (dotted line), made in accordance with the method of the present invention, is compared at a given mass.

Figures 6, 7:
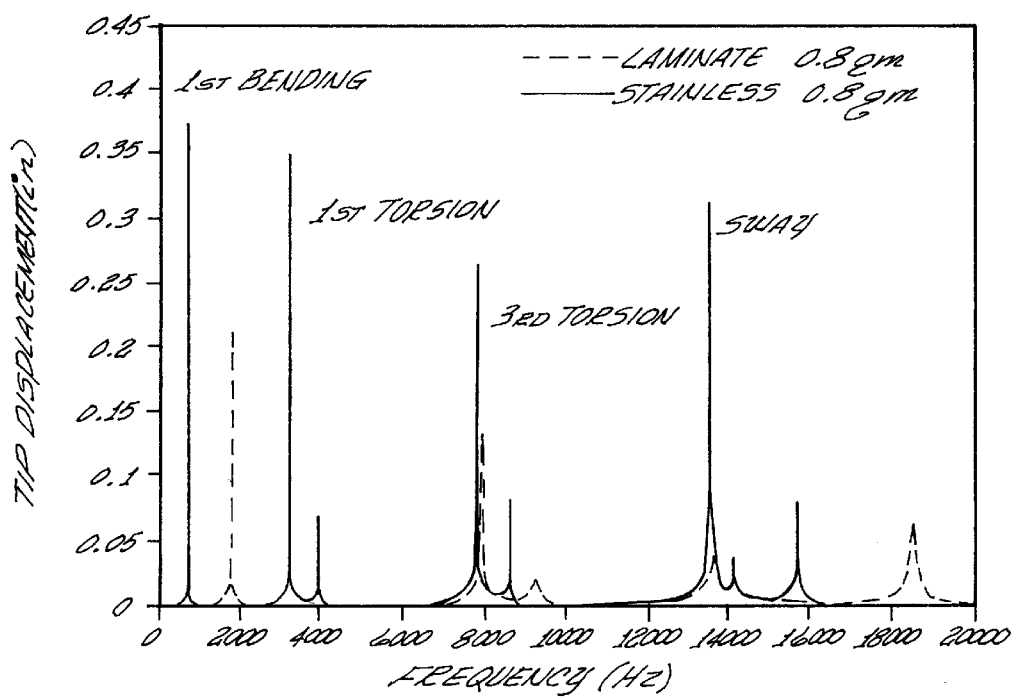
FIG. 6 is a graphical representation showing the computed vibrational frequency and amplitude of several vibrational modes for the suspension arm illustrated in FIG. 4 for a unitary stainless steel structure (solid) and a laminate stainless steel structure (dotted) of similar mass made in accordance with the present invention in response to a prescribed vibrational input.
FIG. 7 is a table comparing the physical characteristics, resonance frequency, and vibrational damping of structures comprising 301 stainless steel with three stainless steel laminate structures having different SST gage and overall thicknesses.

FIG. 7 is a table comparing the physical characteristics, resonance frequency, and vibrational damping of structures comprising 301 stainless steel with three stainless steel laminate structures having different SST gage and overall thicknesses. The aforenoted trend is even more pronounced for thicker laminates and depends on the relative thickness of the laminate components.

EXAMPLE

Two strips of 0.005" thick 301 stainless steel (SS) were plated on one side with a layer of copper using an electrolytic process. On both strips, the thickness of the copper plating was 5 microns. The strips were then sectioned to have a length and a width of 3" and 2", respectively. A 0.010" thick sheet of Mg dimensioned to have the same length and width as the strips was interposed between the copper-plated surface of the two strips and the structure placed in a vacuum hot press. Stainless steel platens measuring 3.75" in diameter were placed on both sides of the structure to ensure a uniform application of pressure to the metal strips. The chamber was then evacuated to a pressure of 50 microns of Hg and backfilled with gettered Argon to a pressure of 10" Hg. The process was then repeated to ensure that a majority of the oxygen was removed from the hot-press chamber.

The unconsolidated structure was heated to a temperature of 200° C. for 0.5 hours to allow any adsorbed gasses and moisture to escape from the metal layers. During this period, the chamber pressure was reduced to between 50 and 100 microns Hg and the temperature was probed with two thermocouples that were placed adjacent to the metal strips. The temperature was subsequently raised to 450° C. at a rate of 10° C./min and the assembly was compressed to a pressure of 160 psi once the temperature was reached. The system was allowed to equilibrate and held at this temperature for 15 minutes. Initial diffusion in the solid state begins at this time. The samples were then heated to a temperature of 520° C. at 10° C./min, above that of the eutectic melting point, and held at 520° C. for 15 minutes at the aforementioned pressure. During this time, a thin liquid layer consisting of the Mg—Cu alloy forms. An increase in pressure to 400 psi was then applied to the metal strips via the platens and resulted in liquid flow. Although fluid flow also occurs at the lower pressure, the sudden increase in pressure is thought to facilitate the breakup of the oxide layer(s) present on the surface of the copper and magnesium. The laminate structure was held at this temperature and pressure for 50 minutes and solidified isothermally as diffusion depleted the copper plating. The assembly was then cooled to room temperature and removed from the hot-press chamber.

Evidence of fluid flow was observed at the edges of the layers comprised of the metal strips, confirming the formation of low melting point eutectic alloy at the Mg-stainless steel interface. In addition, the eutectic structure of the Cu—Mg alloy that formed at the interface was verified with optical microscopy. The unitary structure of the laminate was confirmed by mechanical testing, including destructive bend and peel tests.

While particular embodiments of the present invention have been illustrated and described, it would be obvious to those skilled in the art that various other changes and modifications can be made without departing from the spirit and scope of the invention. For example, other plating materials such as tin or lead can be applied to stainless steel or other base metals and materials other than magnesium may be selected for the interposed layer. The only condition is that the plating material and the interlayer material form a liquid phase at a temperature below the melting points of the constituent materials, including that of the base metal used for the stiff outer skin. It is therefore intended to cover in the appended claims all such changes and modifications that are within the scope of this invention.

What I claim is:

1. A laminate structure comprised of two sheets of base metals having an alloy layer therebetween made by the method comprising the steps of:

(a) presenting a first sheet of a base metal having a plated surface with a first alloyable metal plated thereon;

(b) presenting a second sheet of a base metal having a plated surface with said first alloyable metal plated thereon;

(c) placing a sheet of a second alloyable metal between said plated surface of said first and second sheets of base metal to form an unconsolidated structure; then (d) applying a first pressure to said first and second sheets of base metal to compress said sheet of second alloyable metal disposed therebetween;

(e) heating the compressed structure to a phase transition temperature that is less than the melting point of said first alloyable metal and said second alloyable metal;

(f) applying a second pressure greater than said first pressure in order to induce flow of a liquid phase and disrupt any oxide layers present at an interface between said first and second sheets of base metal and said second alloyable metal; then (g) maintaining the compressed structure at the phase transition temperature and said second pressure to form a laminate structure; then (h) cooling the laminate structure.

2. The laminate structure of claim 1 wherein said two sheets of base metal are stainless steel.

3. The laminate structure in accordance with claim 1 wherein said first alloyable metal is copper.

4. The laminate structure in accordance with claim 1 wherein said second alloyable metal is magnesium.

5. The laminate structure in accordance with claim 2 wherein said first alloyable material is copper.

6. The laminate structure in accordance with claim 2 wherein said second alloyable metal is magnesium.

7. A laminate structure comprised of two sheets of base metals having an alloy layer therebetween made by the method comprising the steps of:

(a) presenting a first sheet of a base metal having a plated surface with a first alloyable metal plated thereon;

(b) presenting a second sheet of a base metal having a plated surface with said first alloyable metal plated thereon;

(c) placing a sheet of a second alloyable metal that is different from said first alloyable metal between said plated surface of said first and second sheets of base metal to form an unconsolidated structure, a eutectic alloy comprised of said first and second alloyable metals having a melting point that is less than the melting point of either said first or said second alloyable metal; then (d) applying a first pressure to said first and second sheets of base metal to compress said sheet of second alloyable metal disposed therebetween;

(e) heating the compressed structure to a phase transition temperature;

(f) applying a second pressure greater than said first pressure in order to induce flow of a liquid phase and disrupt any oxide layers present at an interface between said first and second sheets of base metal and said second alloyable metal; then (g) maintaining the compressed structure at the phase transition temperature and said second pressure to form said laminate structure; then (h) cooling the laminate structure.

* * * * *